US007024419B1

(12) United States Patent
Klenk et al.

(10) Patent No.: US 7,024,419 B1
(45) Date of Patent: Apr. 4, 2006

(54) NETWORK VISUALIZATION TOOL UTILIZING ITERATIVE REARRANGEMENT OF NODES ON A GRID LATTICE USING GRADIENT METHOD

(75) Inventors: Juergen Klenk, Adliswil (CH); Patrick Ziegler, Buochs (CH)

(73) Assignee: International Business Machines Corp., Armonk, NY (US)

( * ) Notice: Subject to any disclaimer, the term of this patent is extended or adjusted under 35 U.S.C. 154(b) by 873 days.

(21) Appl. No.: 09/644,178

(22) Filed: Aug. 23, 2000

(30) Foreign Application Priority Data

Sep. 13, 1999 (EP) .................................. 99810817

(51) Int. Cl.
*G06F 17/00* (2006.01)
*G06F 7/00* (2006.01)

(52) U.S. Cl. ........................ 707/102; 707/104.1; 716/8
(58) Field of Classification Search ................ 707/1–5, 707/100–104.1; 716/7–13
See application file for complete search history.

(56) References Cited

U.S. PATENT DOCUMENTS

| | | | | |
|---|---|---|---|---|
| 3,617,714 | A | * | 11/1971 | Kernighan et al. ............ 716/7 |
| 4,953,106 | A | | 8/1990 | Gansner et al. ............. 345/440 |
| 5,513,124 | A | * | 4/1996 | Trimberger et al. ........... 716/7 |
| 5,640,327 | A | * | 6/1997 | Ting ............................... 716/7 |
| 5,930,784 | A | * | 7/1999 | Hendrickson .................. 707/2 |
| 5,987,470 | A | * | 11/1999 | Meyers et al. .............. 707/102 |
| 5,995,114 | A | * | 11/1999 | Wegman et al. ............ 345/440 |
| 6,363,518 | B1 | * | 3/2002 | Lee ............................... 716/10 |
| 6,389,418 | B1 | * | 5/2002 | Boyack et al. ................. 707/6 |
| 2003/0120630 | A1 | * | 6/2003 | Tunkelang ....................... 707/1 |

FOREIGN PATENT DOCUMENTS

| | | |
|---|---|---|
| EP | 0 903 693 A2 | 3/1999 |
| EP | 0903693 A2 * | 3/1999 |
| EP | 1085693 A2 * | 3/2001 |
| WO | WO 99/63455 A1 * | 12/1999 |

OTHER PUBLICATIONS

Fruchterman, T.M.J. and E.M. Reingold "Graph Drawing by Force-Directed Placement", Software—Practice and Experience, vol. 21, pp. 1129-1164, Nov. 1991.*

Tunkelang, D. "A Practical Approach to Drawing Undirected Graphs", Technical Report CMU-CS-94-161, School of Computer Science, Carnegie Mellon University, Jun. 1994.*

(Continued)

*Primary Examiner*—Luke S Wassum
(74) *Attorney, Agent, or Firm*—Satheesh Karra, Esq.

(57) ABSTRACT

A visualization system and method for visualization of network data, which is data that represents elements and links between elements. The network data is converted into a data structure, which represents a grid arrangement of the elements, where each element is placed on an individual grid position of a lattice. The data structure is suitable for use by a graphics display. The visualization tool comprises a processing unit that generates an initial data structure which represents an initial grid arrangement of the elements. It then assigns a global value to this initial grid arrangement and employs a gradient method for converting the initial grid arrangement into another grid arrangement which has a decreased or an increased global value.

48 Claims, 7 Drawing Sheets

OTHER PUBLICATIONS

Di Battista, G, P. Eades, R. Tamassia and I.G. Tollis "Algorithms for Drawing Graphs: An Annotated Bibliography", Technical Report, Brown University, Jun. 1994.*

Cohen, R.F., P. Eades, T. Lin and F. Ruskey "Volume Upper Bounds for 3D Graph Drawing", Proceedings of the 1994 Conference of the IBM Centre for Advanced Studies on Collaborative Research, 1994.*

Monien, B., F. Ramme and H. Salmen "A Parallel Simulated Annealing Algorithm for Generating 3D Layouts of Undirected Graphs", Proceedings of the International Symposium on Graph Drawing (GD'95), pp. 396-408, 1995.*

Garg, A. and R. Tamissia "GIOTTO3D: A System for Visualizing Hierarchical Structures in 3D", Proceedings of the Internationa Symposium on Graph Drawing (GD'96), Sep. 18-20, 1996.*

Davidson, R. and D. Harel "Drawing Graphs Nicely Using Simulated Annealing", ACM Transactions on Graphics, vol. 15, No. 4 pp. 301-331, Oct. 1996.*

Coleman, M.K. and D.S. Parker "Aesthetics-Based Graph Layout for Human Consumption", Software—Practice and Experienc vol. 26, No. 12, pp. 1415-1438, Dec. 1996.*

Tunkelang, D. "JIGGLE: Java Interactive Graph Layout Environment", Proceedings of the International Symposium on Graph Drawing (GD'98), pp. 413-422, 1998.*

Tunkelang, D. "A Numerical Optimization Approach to General Graph Drawing", PhD. Thesis, School of Computer Science, Carnegie Mellon University, CMU-CS-98-189, Jan. 1999.*

Behzadi, L. "An Improved Spring-Based Graph Embedding Algorithm and LayoutShow: A Java Environment for Graph Drawing", M.S. Thesis, Computer Science, York University, Ontario Canada, Jul. 1999.*

Brandenburg, F.J. "Graph Drawing: Past, Present, Future", University of Passau, powerpoint presentation, 82 slides, downloaded from www.csse.monash.edu.au/~gfarr/research/GraphDrawing02-Mel.ppt, Oct. 2002.*

Eades, P. "A Heuristic for Graph Drawing", Congressus Numerantium, vol. 42, 1984, pp. 149-160.*

Masui, T. "Graphic Object Layout with Interactive Genetic Algorithms", Proceedings of the IEEE Workshop on Visual Language (VL92), Sep. 15-18, 1992, pp. 74-80.*

Eloranta, T. and E. Makinen "TimGA—A Genetic Algorithm for Drawing Undirected Graphs", Technical Report A-1996-10, University of Tampere (Finland), Department of Computer Science, Dec. 1996.*

Schweikert, D.G. and B.W. Kernighan "A Proper Model for the Partitioning of Electrical Circuits", Annual ACM IEEE Design Automation Conference, Proceedings of the 9$^{th}$ Workshop on Design Automation, pp. 57-62, 1972.*

European Search Report dated Oct. 29, 2003 issued in a counterpart application, namely, Appln. No. 00118557.8.

Coleman et al., "Aesthetics-Based Graph Layout for Human Consumption", Software-Practice and Experience, vol. 26 (12), pp. 1415-1438, Dec. 1996.

Davidson et al., "Drawing Graphs Nicely Using Simulated Annealing", ACM Transactions on Graphics, vol. 15, No. 4, Oct. 1996, pp. 301-331.

Tunkelang, "JIGGLE: Java Interactive Graph Layout Environment", GD'98, LNCS 1547, pp. 413-422, 1998.

Kamps et al., "Constraint-Based Spring-Model Algoithm for Graph Layout", pp. 349-360.

Gupta et al., "Optimal Three-Dimensional Layouts of Complete Binary Trees", Information Processing Letters 26 (1987/88), pp. 99-104.

Bienemann et al., "A Simulated Annealing Approach to the General Graph Layout Problem", pp. 255-260, 1986.

Clarkson, Mark A., *An Easier Interface,* Byte, Feb. 1991, pp. 277-282.

DiBattista, Giuseppe, et al., *An Experimental Comparison of Four Graph Drawing Algorithms,* Computational Geometry, 1997, pp. 303-325.

Eades, Peter, et al., *An Algorithm for Drawing a Hierarchical Graph,* International Journal of Computational Geometry & Applications, vol. 6, No. 2 (1996), pp. 145-155.

Robertson, George G., et al., *Information Visualization Using 3D Interactive Animation,* Communications of the ACM, Apr. 1993, vol. 36, No. 4, pp. 57-71.

* cited by examiner

NETWORK VISUALIZATION TOOL UTILIZING ITERATIVE REARRANGEMENT OF NODES ON A GRID LATTICE USING GRADIENT METHOD

PRIORITY

This application claims priority to an application entitled "Network Visualization Tool" filed in the European Patent Office on Sep. 13, 1999 and assigned Patent Application No. 99810817.9, the contents of which are hereby incorporated by reference.

BACKGROUND OF THE INVENTION

1. Field of the Invention

The present invention relates generally to the visualization of data, and in particular, to a device and method for visualizing networks by converting network data into a data structure.

2. Description of the Related Art

Data, when presented as rows and columns of numbers and text, is typically raw and undifferentiated. To be useful, raw data must be organized into intelligible categories. Data can also be obscure in the sense that its relevant attributes and relationships are hidden. Normally, the user must conduct an investigation (e.g. by using appropriate data mining tools) to discover such relationships and attributes.

If one presents data in the form of a graph—a representational scheme herein referred to as a "network"—one can supply meaning and context. That is, data—if grouped into relevant categories—can be more easily comprehended. One approach to increasing comprehension of data is data visualization. Data visualization utilizes tools, such as display space plots, to represent data within a display space defined by the coordinates of each relevant data dimensional axis.

Linguists, mathematicians, computer scientists, and others need tools that can visualize networks. Considerable progress has been made in the development of software tools that serve that purpose.

Software tools are known that can be used to create appropriately formatted "trees". Trees are natural structures that appear in many computer science applications (e.g., data structures, databases, networks, etc.). These software tools usually require textual data input and are able to format trees, make small changes to the nodes and layout, and align nodes. Most of the currently available software tools only produce 2-dimensional (2D) trees. These tools are suited for drawing grammar trees (syntax parse trees), or trees that allow the visual inspection of networks.

Software tools are available that can generate 3-dimensional (3D) tree drawings. An example is the cone tree system from Xerox PARC, as described by George Robertson, Jock Mackinlay, and Stuart Card in "Information visualization using 3D interactive animation", Communications of the ACM, 1993, 36(4), 57–71. The Xerox PARC cone tree is a 3D radial tree layout presented in Euclidean three-dimensional space.

Another attempt at data visualization through a 3D mapping is illustrated in the CAM Tree developed by Xerox PARC and described by M. Clarkson, in "An Easier Interface", Byte Magazine, February 1991. The CAM Tree is essentially a three-dimensional tree with limited ability to represent anything more than the hierarchical structure of a data base. The attributes of the data remain hidden.

Traditionally, software tools for visualization of networks portray the respective data in a tree-like format only, as outlined above.

There are other areas where software tools for visualization are employed. Examples are the visualization tools used in connection with high speed logic and circuit simulators, which are used throughout the computer industry in the design of complex systems. The high performance simulators generate enormous amounts of data that are displayed on a screen to allow a user to intervene. An example of such a system is described and claimed in U.S. Pat. No. 5,043,920 entitled "Multi-dimension visual analysis".

Existing visual presentation systems do not provide a developer or operator means of easily identifying glitches or bottlenecks in complex communication systems. For example, a developer or operator is forced to make inferences concerning the relationships between various types of hardware elements of a network, when these elements are graphically presented on a screen, in order to understand how to improve the respective network.

Another area where networks have become important are site maps on the World Wide Web. Here each page is seen as a node in a network, and the links between the pages are the links in the network. Site maps allow a user to easily navigate through a complex site. In addition, they are useful to mine the information on the World Wide Web, e.g. by analyzing which sites have many incoming or outgoing links, thus identifying authority sites on a certain subject or reference sites.

There are a number of attempts in the literature to solve certain problems which occur when drawing networks (known as graph drawing problems). A recent overview is given in the article "An experimental comparison of four graph drawing algorithms" by Di Battista et. al., Computational Geometry 7, 1997, pp. 303–325. These algorithms are used for 3D-visualization of non-hierarchical networks.

In the article "An algorithm for drawing a hierarchical graph" by R. Tamassia et. al, Int. J. Comput. Geom. Appl. (Singapore) Vol. 6, No. 2 Jun. 1996, pp. 145–155, an algorithm to optimally draw a hierarchical network is described. However, this algorithm uses only a line for each level of hierarchy to arrange the elements and requires the initial placement of elements on the top and bottom hierarchy lines.

The article "GIOTTO3D: a system for visualizing hierarchical structures in 3D" by R. Tamassia et. al., Graph Drawing, Symposium on Graph Drawing, GD '96, Proceedings 1997, pp. 193–198, describes a tool that can arrange a hierarchical network in an optimal 3D-arrangement. A bend-minimization algorithm (from a 2D graph drawing tool) is used.

There are many more areas where visualization tools can be employed since almost all intelligent systems rely heavily on networks and their visualization.

Thus there is a demand for a robust 3D data representation method and system that overcomes problems of known approaches and systems. Such problems include, but are not limited to, the inability to display attributes of data, the limitation of visualizations to tree-like formats, the inability for a user to intuitively identify problems in a visualization, and the lack of detail in hierarchical descriptions of data.

SUMMARY OF THE INVENTION

One object of the present invention to improve the interaction between humans and computers.

Another object of the present invention is to provide an system and method for visualizing elements of a network on a display.

Another object of the present invention is to provide a system and method for processing large amounts of information and for displaying that information graphically.

Yet another object of the present invention is to provide a system and method for acting upon elements of network that are displayed on a display.

Still another object of the present scheme is to provide a system and method for making abstract relationships or associations between network elements more concrete and accessible.

To achieve the above and other objects, there is provided a method and system for displaying a three-dimensional navigable display space containing an aggregation of elements and links between elements. A special perspective is provided by processing and displaying the data structure so that a user can see a representative overview of the entire aggregation of elements and links (or a subset thereof) that have been selected for display together on a display screen.

In another aspect, the present invention provides a method and corresponding system for facilitating the visual exploration of hierarchical and non-hierarchical networks. The method and corresponding system provides an easily comprehensible view of the whole network or a part thereof and allows interactive editing of the network, and/or its elements, and/or its links.

In a further aspect, the present invention provides the ability to use the space between visual elements as a representation of a relationship, e.g., by placing related elements closer together than elements that have no relationship or only a remote relationship. The present invention provides the ability to introduce depths into a visual space such that the depth conveys distance where elements in the foreground are the focus of attention.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
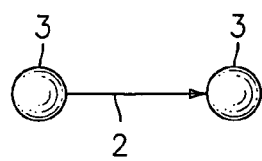
FIG. 1 is a schematic representation of a simple network with two elements and one link.

A preferred embodiment of the present invention will be described below with reference to the accompanying drawings. In the following description, well-known functions or constructions are not described in detail since they would obscure the invention in unnecessary detail.

In order to explore, construct, or maintain a network it is helpful that the network be visualized in an easily comprehensible way, so that its topological structure can be easily explored and modified, if necessary. Studies show that people easily comprehend a visualization of a network if the elements of the network are arranged such that links between the elements exhibit a minimal entanglement and at the same time a minimal length. However, in most cases these two requirements of minimal entanglement and minimal length are mutually exclusive, so that one cannot expect to find an arrangement of the elements which yields both a minimal entanglement and a minimal length of their links. Instead, the most easily comprehensible arrangement of the elements will only have a near minimal entanglement and a near minimal length of their links. In the present context, the above described arrangement of elements of a non-hierarchical network is referred to as the optimal arrangement.

An additional requirement for the arrangement of elements is that they be kept a minimal distance apart so that they can be clearly distinguished. This requirement can be fulfilled if one provides a grid (a lattice with individual grid points) and requires that the elements be arranged only on the grid points. For instance, as a grid one might specify a square lattice or a circle with a given number of grid points distributed at equal angular distances. When a network of n nodes is to be optimally arranged on a grid with k grid points, there are $k!/(k-n)!$ possible arrangements of the elements (where $k!=1*2* \ldots *k$ denotes the factorial of k). This combinatorial calculation indicates that the most obvious way to find the optimal arrangement is by considering all possible arrangements of exponential complexity; however, this, in general, is unsolvable for computer systems.

1. Definitions

Before addressing different aspects and embodiments, relevant terms and expressions will be defined and explained.

Network: A network is a graph comprising elements (nodes, vertices, and the like) and links (connections, edges, and the like) between some of the elements. An example of a network is a data structure as described in PCT patent application with application serial number PCT/IB99/00231, filed on 11 Feb. 1999, with a priority date of 2 Jun. 1998, which is currently assigned to the present assignee. In this example the network comprises semantical units (elements) and connection objects (links) between these semantical units. This co-pending patent application is incorporated in its entirety.

Element: An "element" is used to describe an individual unit of a network (graph), database, data structure, or some other form of representation. Examples of elements are: files (e.g., computer or machine readable files), objects, information kept in a cell of a database, a database record, an image from an image repository, a multimedia object (e.g., an avi or mpeg movie), a semantical unit, or a physical network element of a communications network (such as a switch, router, node, gateway, computer, access device and so forth).

Link: A "link" can be a physical or logical link between elements. Such a link can describe a relationship or connection between the respective elements. There is a variety of meanings that can be assigned to a link. In the above-mentioned patent application networks are described where semantical units (elements) are connected by so-called connection objects (links), whose meanings can be similarities, (information) exchanges, groupings, role descriptions, etc.

The word "network" is herein used to describe any collection or aggregation of elements and links. For the purposes of the present invention, it does not matter whether the network is structured or unstructured. For example, a network can be a computer program-produced network (e.g., a network with application-specific information). Other examples include communications networks (e.g., comprising switches, routers, nodes, gateways, computers, access devices, or any combination thereof), knowledge databases, networks or graphs representing weather data or weather maps, and the like.

A simple network 1 is schematically represented in FIG. 1. In the present example, the network 1 consists of elements which are visualized as spheres 3, and a link which is visualized as arrow 2. Usually a link 2 connects two elements 3, as illustrated in FIG. 1.

Network data: The expression "network data" is used to describe some collection of data that represents the elements and links of a network. Network data can be structured or unstructured. Network data can be derived from raw data. Raw data is data in some idiosyncratic format. Raw data comes in many forms, from spreadsheets to input text, textual strings, output data of an application program, and so forth. The transformation of raw data into network data typically involves the loss or gain of information.

Data structure: In order to be able to visualize network data, the network data has to be transformed or mapped into a so-called "data structure". This data structure then can be processed and displayed on a graphics display of a graphics system. Such a data structure can also be stored on a medium for later use, or it can be transmitted via a communications channel. The data structure may, for example, augment a spatial substrate with marks and graphical properties to encode information, as described on pages 26–34 of the book "Information Visualization; Using Vision to Think", Stuart K. Card et al., Morgan Kaufmann Publishers, Inc., San Francisco, Calif., USA, 1999. To be a good data structure, the mapping of the network data into the data structure must preserve the data. Network data can be transformed or mapped into data structures in multiple ways. A family or group of algorithms which can be used for transformation of network data into some data structure will be addressed below.

Hierarchical network: A network is called "hierarchical" if, besides the normal, non-scaling links, there are also scaling links. Examples are: a license agreement, a joint project agreement, and an employment contract which are all grouped in the semantical unit (element) 'agreements' by their similarity (they are all agreements), while a liability provision, a license grant provision, and an arbitration provision are all grouped in the semantical unit (element) 'agreement' by their functional connection (they are all functional parts or elements of an agreement).

Fractal hierarchical network: A hierarchical network is called "fractal" if the following four conditions are satisfied:
1. All elements are similar (derived from one template);
2. All links are similar (derived from one template);
3. Links may also be elements; and
4. Hierarchical links are possible, and at least one element must have a hierarchical link.

When visualizing a hierarchical network the hierarchical structure must be clearly visible, which is achieved by arranging the elements in vertically stacked layers which correspond to the levels of hierarchy. Here again, the visualization of the hierarchical network must be easily comprehensible, which means that the elements must be arranged in such a way that there is a near minimal entanglement and a near minimal length of links within each layer and of links between layers. In the present invention, the above described arrangement of elements of a hierarchical network is referred to as the optimal arrangement.

It is also a requirement for a hierarchical network and a fractal hierarchical network to arrange its elements such that they are kept apart a minimal distance so that they can be clearly distinguished. This requirement can be fulfilled if one provides a grid (lattice with individual grid points) and requires that the elements be arranged on the grid points only. As an example, one might specify a cubic or a cylindrical lattice as a grid.

Gradient Method: A "gradient method", as employed in connection with the present invention, starts with an arrangement of a plurality of elements on a predefined grid (herein referred to as the "current grid arrangement"). These elements together with some links form a network. This current grid arrangement has a corresponding global value (initial global value). This global value corresponds to the ease of perception of the visualization of the network, i.e. of the current grid arrangement. Depending on the implementation, either a decrease or an increase of the global value makes the visualization more easily comprehensible. The gradient method produces from the current grid arrangement another grid arrangement of the plurality of elements that has a global value which is either smaller or larger than the initial global value, thus making the visualization of the other (new) grid arrangement more easily comprehensible. Ideally, one employs a gradient method which, depending on the implementation, reaches the minimal or maximal global value, or a near-minimal or a near-maximal global value, i.e. the optimal or a near-optimal grid arrangement, very quickly.

For the purposes of the present description, the global value is considered to approach:
(1) the minimal global value of the network if the global value is less than a specified threshold greater than the minimal global value; or
(2) the maximal global value of the network if the global value is less than a specified threshold smaller than the maximal global value.

Note that the threshold depends on the definition of the global value, i.e. its relation to the degree of comprehensibility of the visualization of the network.

A near minimal entanglement of the links is deemed to have been reached if the number of crossings of links (which is a measure of the degree of entanglement) is less than 50% greater than the minimal number of crossings of links. The minimal entanglement of the links is reached if the number of crossings of a particular arrangement is equal to the minimum number of crossings of links.

A near minimal length of the links is deemed to have been reached if the sum of the length of all links is less than 50% greater than the minimal length the of links. The minimal length of the links is reached if sum of the length of all links of a particular arrangement is equal to the minimal length of the links.

This means that the corresponding algorithm terminates in polynomial time, which renders the problem of finding the optimal or near-optimal arrangement computable. In order to reach this optimal or near-optimal arrangement in only a few iterative steps (cycles), the elements' position on the grid should be re-arranged by looking for changes in the arrangement that lead to big changes in the global value. For this purpose, a gradient level or threshold should be defined that has to be reached or exceeded by any given step to make sure that only those changes of the grid arrangement are actually carried out that lead to a drastic reduction or increase of the global value. This gradient level or threshold may depend on the current iteration number and/or on the current global value. Doing so ensures that only very few cycles are required until the global value converges to the minimal or maximal, or near-minimal or near-maximal, global value. Please note that in the following embodiments algorithms (herein referred to as minimizing algorithms) are employed which decrease and eventually minimize the global value. Likewise, algorithms can be employed that increase and eventually maximize the global value (herein referred to as maximizing algorithms).

2. Overview of the Present Invention

According to the present invention there is a basic process that is carried out in order to transform network data, which represent a plurality of elements and links between elements, into a data structure which has a global value that is the same or approximately the same as the network's minimal or maximal global value.

Figure 8:
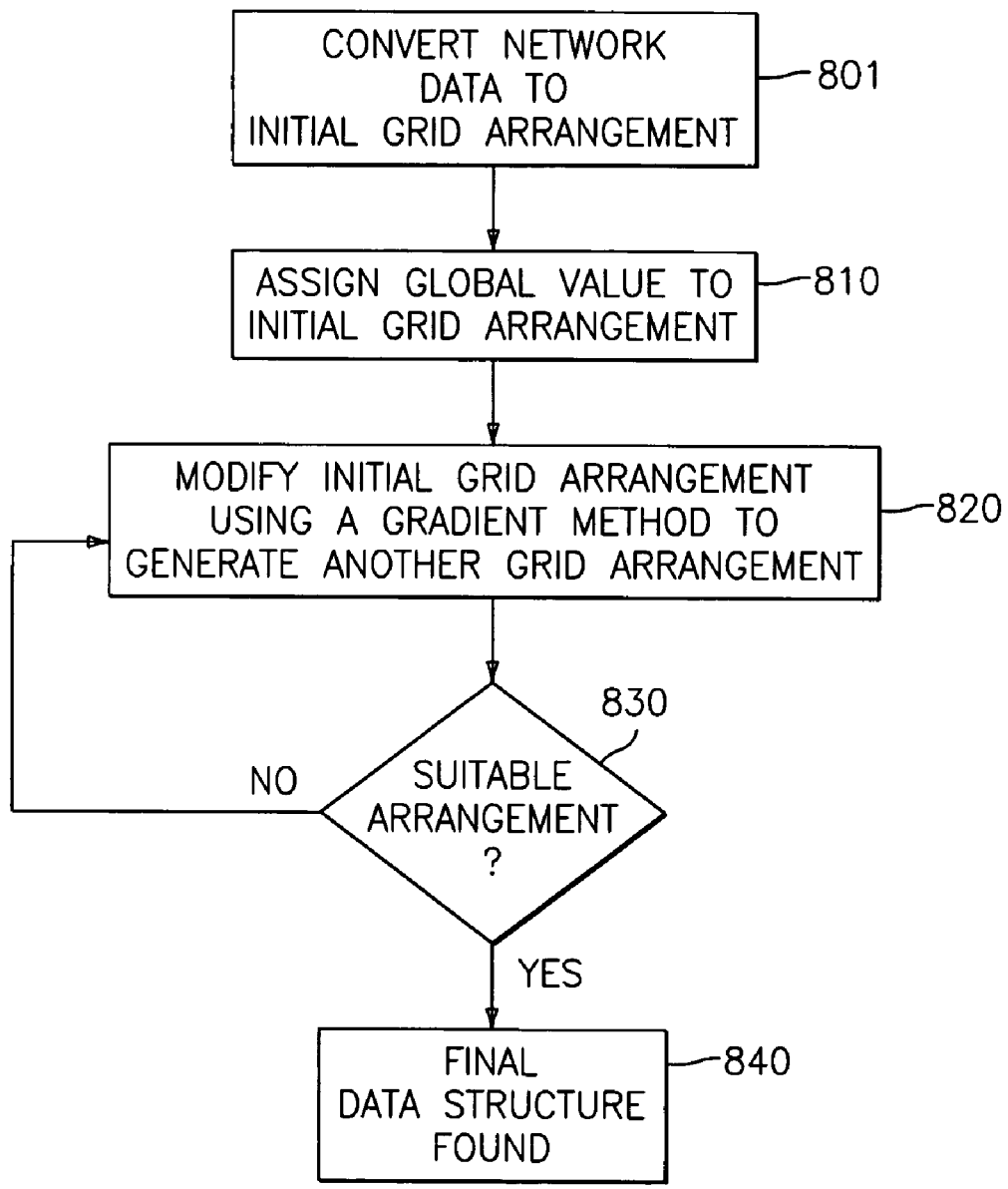
FIG. 8 is a flow chart of the network visualization method according to an embodiment of the present invention.

In a first step, as shown by reference number 801 in FIG. 8, network data is converted into an initial data structure which is represented by an initial grid arrangement of the plurality of elements. This initial grid arrangement has an initial global value and can be generated by placing each element on an individual grid position of a lattice. This lattice (e.g., a square lattice, circle lattice, cubic lattice, or cylindrical lattice) may depend on various parameters, such as the resolution of the graphics display, the number of elements, the computational power of the system generating the data structure, and so forth. The initial grid arrangement can be generated in many different ways, such as a random arrangement of the elements.

In step 810, a global value (global energy) is assigned to this initial grid arrangement. The global value depends on the initial grid arrangement of one or more elements (all of the elements in the example) more with respect to the initial grid positions of said element(s)' neighbors and is herein referred to as initial global value.

At step 820, the initial grid arrangement is modified so as to generate another grid arrangement of the plurality of elements. For this purpose a gradient method is employed using the global value of the grid arrangement of the plurality of elements. A suitable gradient method finds, after a number of iterations of steps 830 and 820, a suitable arrangement (preferably the optimal arrangement) of a given network or a part thereof on a given grid, as shown in step 840.

3. Gradient Method

It is important that the algorithm which defines the gradient method describes a solution which is of polynomial complexity, and, thus, is solvable by computer systems. It is also desirable to employ an algorithm which is efficient and of low complexity so that an efficient and fast tool for visualizing networks can be realized.

According to one embodiment of the present invention, an optimal arrangement of the elements and links of a network is found by minimizing the total energy function of this network. The total energy function of the network is a function which depends on the arrangement of the elements on the grid and which measures a suitable combination of the total length of all links and the number of crossings of links. It is defined such that the smaller the result (i.e. the smaller the total energy (also called global value)), the more comprehensible the network visualization appears. In addition, this total energy function may be equipped with a parameter that allows the user to continuously shift the emphasis between minimizing the total length of links and minimizing the entanglement of links. Other parameters or factors, such as a weight or potential as described below in connection with a knowledge database, can also be factored in when computing a data structure for visualization.

The minimizing algorithm which finds the optimal arrangement by minimizing the total energy is a gradient method. However, because the problem is discrete (which means that there is a finite number of grid positions where the elements can be placed), ordinary gradient methods do not work since they require a complete underlying space such as $R^n$ (rather than the given grid space).

In one embodiment of the present invention, a gradient method work regardless of the discreteness problem, by defining a local energy function (individual value) for each element. This local energy function depends on the arrangement of the neighboring elements of a given element (or several elements) on the grid and measures a suitable combination of the total length of all links to the given elements, the total number of crossings of these links with (all) other links, and the total number of links to the given element(s). This combination further obeys the property that the weighted sum of all local energies yields the total energy (global value), where the weights are the number of links for each individual element or again a suitable function thereof. The gradient method then consists of selecting two elements (preferably with the help of the above local energy function) whose transposition reduces the total energy as much as possible, and repeating this procedure until no further reduction of the total energy can be achieved, or at least until no large reduction of the total energy is expected anymore.

In detail, the minimizing algorithm according to this embodiment of the present invention starts with an initial arrangement of the elements on the grid that is obtained either by randomly placing the nodes on the grid or by using an arrangement algorithm that finds a reasonable first arrangement of the elements on the grid. This initial arrangement is then defined to be the current grid arrangement.

The local energy function finds the element with the highest local energy for any possible arrangement of the elements on the grid. It is this element with the highest local energy that is selected for a transposition with some other element. The other element is obtained by transposing the highest local energy element with every other element in the network, and selecting the transposition that yields the least total energy for the new arrangement, provided this new total energy is lower than the current total energy. Since there are only (n−1) elements to check and checking can be done in polynomial time, this is a polynomial problem. Selecting the element to be transposed with the highest local energy element can be optimized by a reduction scheme, such as reducing the search to only neighboring elements of the highest local energy element.

In this sense the algorithm is a gradient method because, for any arrangement of the elements, a transposition that reduces the total energy is found. In fact, even the transposition that is likely to maximally reduce the total energy is found. This new arrangement is then called the current arrangement and the minimizing algorithm repeats the above procedure until no transposition can be found that reduces the total energy which means that the optimal arrangement is reached. It is obvious that the repetitive use of the algorithm can be stopped at any time before the optimal arrangement is reached.

If none of the (n−1) transpositions yields a reduction in the total energy, the element with the second highest local energy becomes the focus, and all (n−2) possible transpositions (the transposition with the element with the highest total energy has already been checked in the previous step and does not need to be checked again, hence one has only (n−2) transpositions to check) are tried. The transposition that yields the least total energy for the new arrangement is chosen, provided this new total energy is lower than the current total energy. If there is such an arrangement with lower total energy, then this new arrangement is called the current arrangement and the minimizing algorithm repeats the procedure of the previous paragraph. If no transposition can be found that reduces the total energy, the element with the third highest local energy is selected and all (n−3) possible transpositions are tried. Again, if a new arrangement with less total energy can be found, the algorithm makes it the current arrangement and continues from there by repeating the procedure of the previous paragraph, otherwise it continues with the element with the fourth highest local energy, and so on.

In the worst case this algorithm yields (n−1)+(n−2)+(n−3)+ . . . +2+1=½*n*(n−1) checks which is quadratic in n. The minimizing algorithm stops when none of the transpositions results in a reduction of the total energy.

It is possible that the minimizing algorithm terminates with a final arrangement that corresponds to a local minimum of the total energy, which means that there may be a different arrangement with yet a lower total energy. It has been observed that algorithms that rely on gradient methods sometimes terminate in such local minima (e.g. back propagation learning in neural networks). In this case a simulated annealing method may be in order, which means that after each step a random shuffling of the elements is allowed, where the amount of shuffling depends on the value of a variable called "temperature". This allows the algorithm to jump out of local minima traps and find the global minimum of the total energy.

The success of the minimizing algorithm depends crucially on how well the definition of the total and local energies captures the fact that their values relate directly to the degree of comprehensibility of the visualization of the network. One possible definition is the following:

The length of a link is defined by the integer length of the shortest path through the grid. On a square lattice this would be the number of horizontal and vertical gridpoints that separate the two elements, while on a circle it would be the number of gridpoints between the two elements along the shorter of the two possible paths around the circle. The algorithm to determine the length may be a straightforward counting method, for example. The number of crossings of links is simply a counting problem. It can be done efficiently by a sweep-line algorithm, possibly adapted for the grid type (e.g., on a circle the standard sweep-line algorithm can be simplified by using a specific table which encodes where connections start and end).

Suppose that there are n elements and m links of total length L and with total number of crossings C, and that each element i has $k_i$ connections with a total length of $l_i$ and a total number of crossings $c_i$ (1<i<n). Then, a possible definition for the total energy E and the local energy $e_i$ of each element i is:

$$E = 4 \cdot a \cdot C + 2 \cdot (1-a) \cdot L$$

$$e_i = \frac{a \cdot c_i + (1-a) \cdot l_i}{\sqrt{k_i}}$$

This definition satisfies $$E = \sum_{i=1}^{n} \sqrt{k_i} \cdot e_i$$

so that the total energy is the weighted sum of the local energies. Here the variable a which is allowed to take values 0<a<1 is the parameter that allows the user to shift the emphasis between minimizing the number of crossings (a=1) and minimizing the total length of the links (a=0) or any combination thereof (a between 0 and 1).

Figure 2:
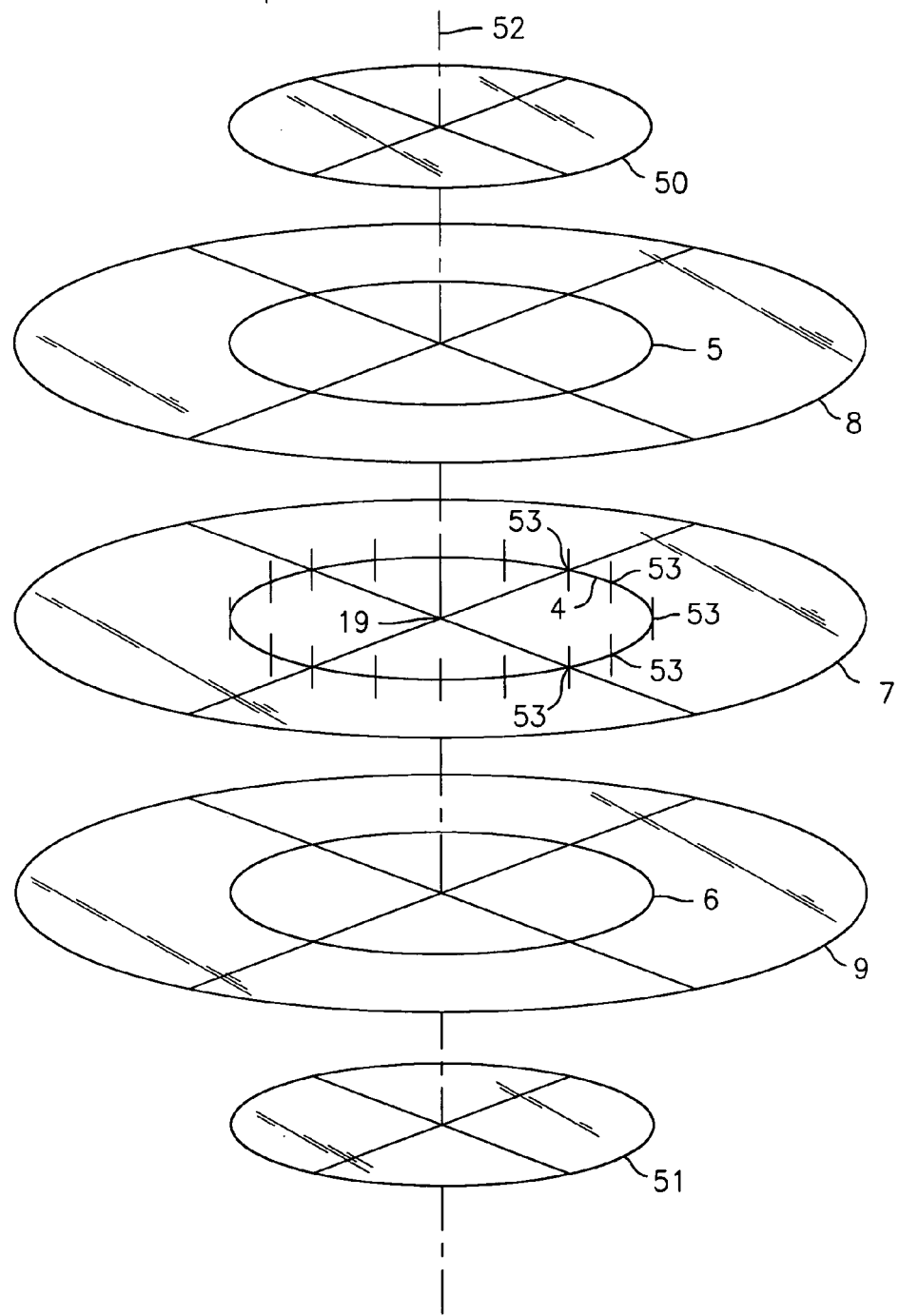
FIG. 2 is a schematic representation of a cylindrical grid as used for the visualization, according to an embodiment of the present invention.

Finally, if one has a collection of grids (e.g. in hierarchical networks where one has several square lattices or circles stacked on top of each other, as shown in FIG. 2) and the elements are not only connected on these grids but also between the grids then one can run the minimizing algorithm for each grid separately (to optimize only this grid) and also for all combinations of two grids separately (to optimize the connections between these two grids). The algorithm to find the optimal arrangement for the whole collection of grids can either optimize one grid after the other and then one combination of two grids after the other using the minimizing algorithm, or it can do one gradient step from the minimizing algorithm per grid and/or combination of two grids at a time, or a combination thereof, to find the optimal arrangement of elements. Finally, the collection of grids could be seen as one new grid, and a global value (global energy) could be assigned to this new grid, and the ordinary gradient method could be carried out on this new grid.

4. Example of Network Visualization

Further details of the present invention are now addressed and described in connection with the embodiments shown in FIGS. 2–5. As mentioned earlier, the elements of a network (or a part thereof) are placed on a grid for visualization. In the present example, the grid is cylindrical, resulting in a grid layout as illustrated in FIG. 2. However, other grid layouts, e.g. cubical, may be chosen. The cylindrical grid layout consists of:

the central position 19;
the circle of first horizontal neighbors 4;
the circle of first upward neighbors 5;
the circle of first downward neighbors 6;
the circle of second horizontal—horizontal neighbors 7;
the circle of second upward-horizontal neighbors 8;
the circle of second downward-horizontal neighbors 9;
the circle of second upward—upward neighbors 50;
the circle of second downward—downward neighbors 51; and
the y-axis 52.

Each circle has a variable number of grid positions 53. In FIG. 2, the grid positions on the circle of first horizontal neighbors 4 are shown. In this example the circle of first horizontal neighbors 4 has 16 grid positions. Elements are placed either on the central position 19, or on a grid position on a circle. To improve the quality of the visualization, the little lines representing the grid positions are sometimes suppressed. When visualizing a hierarchical network the hierarchical structure must be clearly visible. This is achieved by arranging the elements in vertically stacked layers—as shown in FIG. 2 for example—which correspond to the levels of hierarchy.

Elements in the example are grouped as follows:
An element in the central position 19 is called a central element.
An element on circle 4, 5, or 6 is called a first neighbor (to the central element).
An element on circle 7, 8, 9, 50, or 51 is called a second neighbor (to the central element).
Links in the example are grouped as follows:
A link from the central element to a first neighbor is called a 0-1 link.
A link from a first neighbor to a first neighbor is called a 1-1 link.
A link from a first neighbor to a second neighbor is called a 1-2 link.
A link from a second neighbor to a second neighbor is called a 2-2 link.

In the example, the spheres and arrows representing the elements and links, respectively, are selectively suppressed in order to improve the quality of the visualization.

Figure 3:
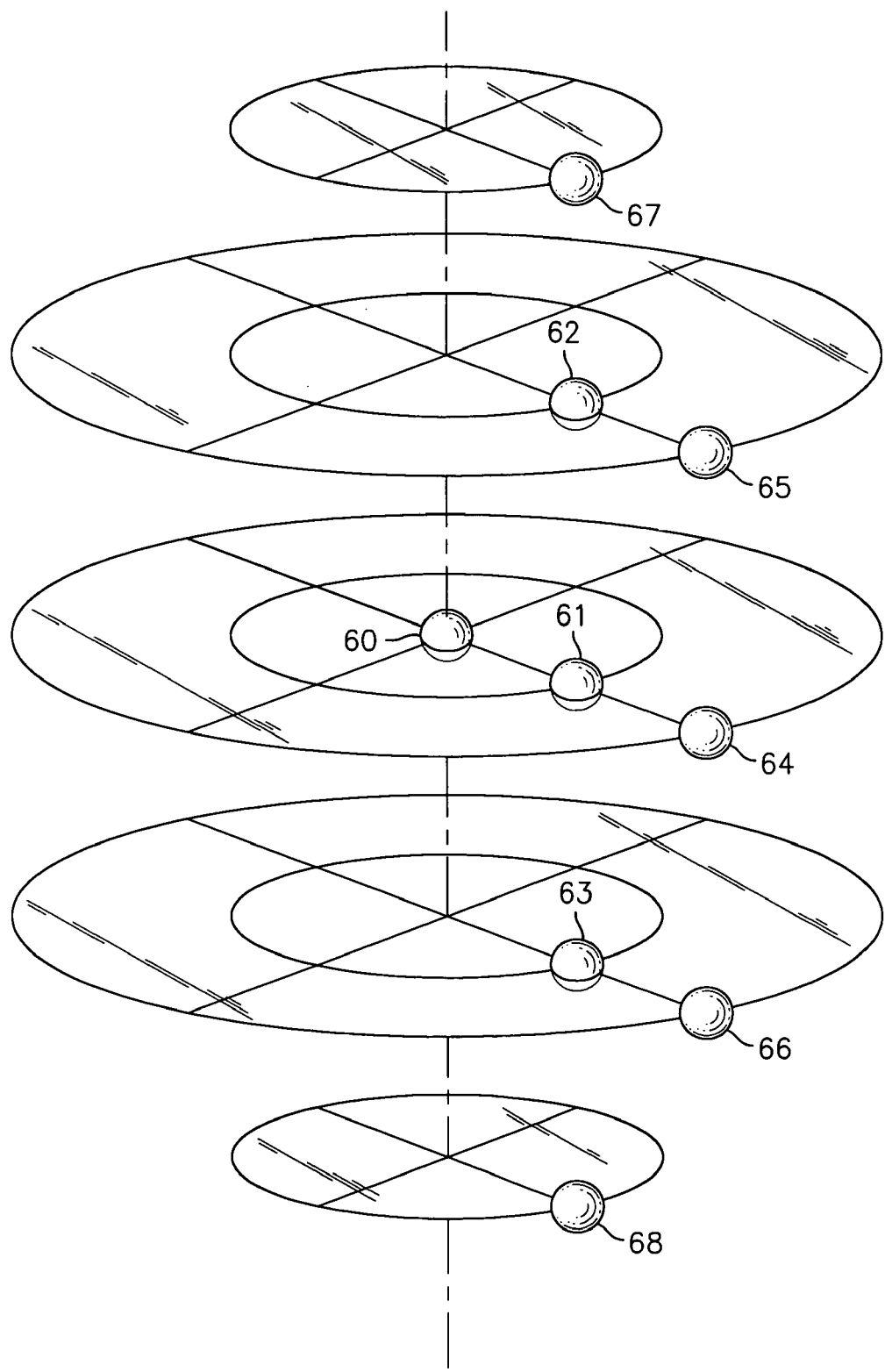
FIG. 3 is a schematic representation of a network with elements placed on various positions, according to an embodiment of the present invention.

FIG. 3 shows elements placed on various positions. In particular, the central element 60 is placed at the central position.
a first horizontal neighbor 61 to the central element 60 is placed on the circle of first horizontal neighbors.
a first upward neighbor 62 to the central element 60 is placed on the circle of first upward neighbors.
a first downward neighbor 63 to the central element 60 is placed on the circle of first downward neighbors.
a second horizontal—horizontal neighbor 64 to the central element 60 is placed on the circle of second horizontal-horizontal neighbors.
a second upward-horizontal neighbor 65 to the central element 60 is placed on the circle of second upward-horizontal neighbors.
a second downward-horizontal neighbor 66 to the central element 60 is placed on the circle of second downward-horizontal neighbors.
a second upward-upward neighbor 67 to the central element 60 is placed on the circle of second upward-upward neighbors.
a second downward-downward neighbor 68 to the central element 60 is placed on the circle of second downward-downward neighbors.

Figure 4:
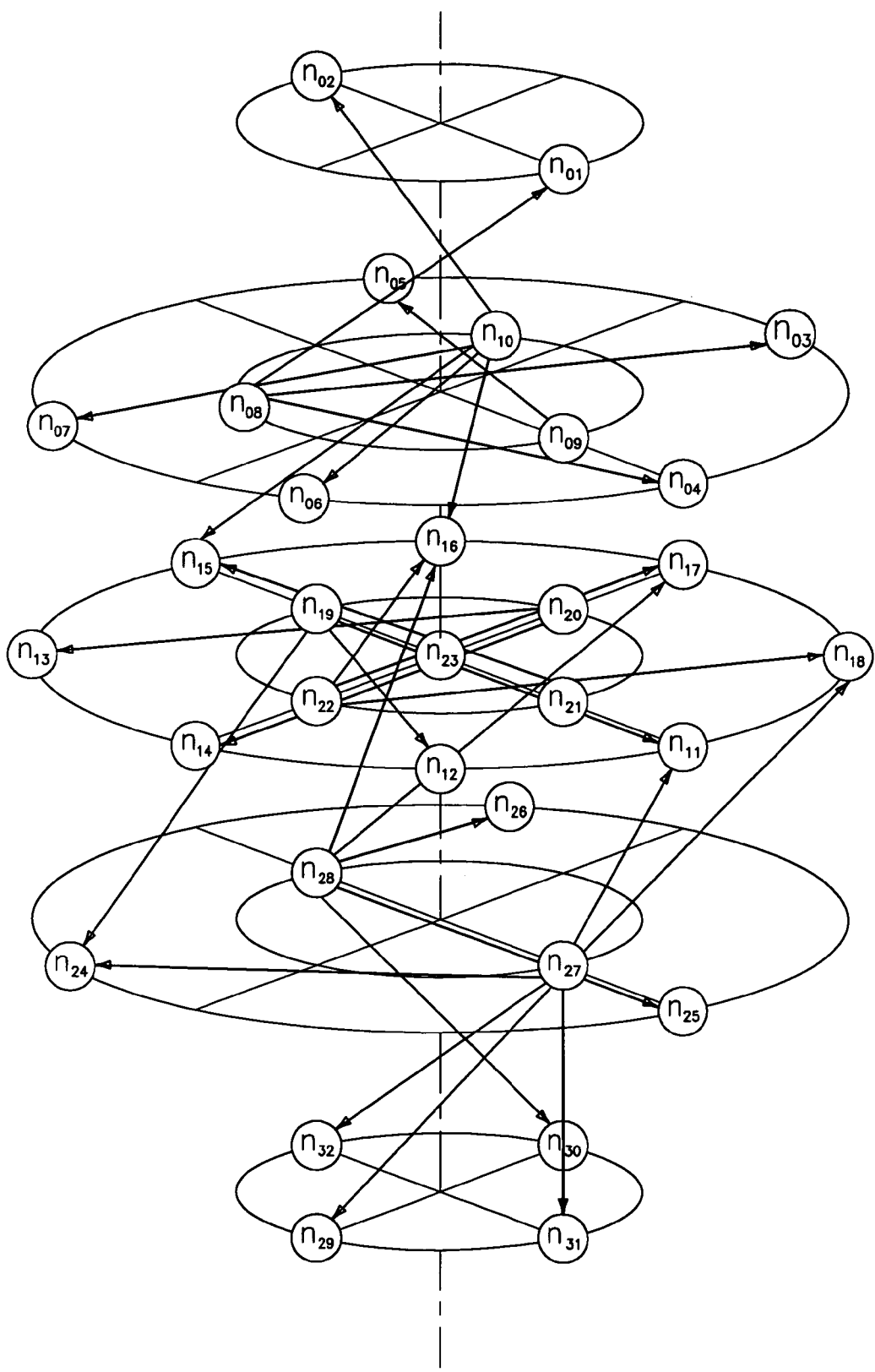
FIG. 4 is a schematic visualization of a network with many elements and links, according to an embodiment of the present invention.

FIG. 4 shows a visualization of a network. Each element has been placed on the circle it belongs to, but on random grid position within the circle. Although only the 1–2 links are shown (all others are suppressed), this results in an almost incomprehensible visualization of the network. Each element carries a unique identifier $n_{xy}$.

Figure 5:
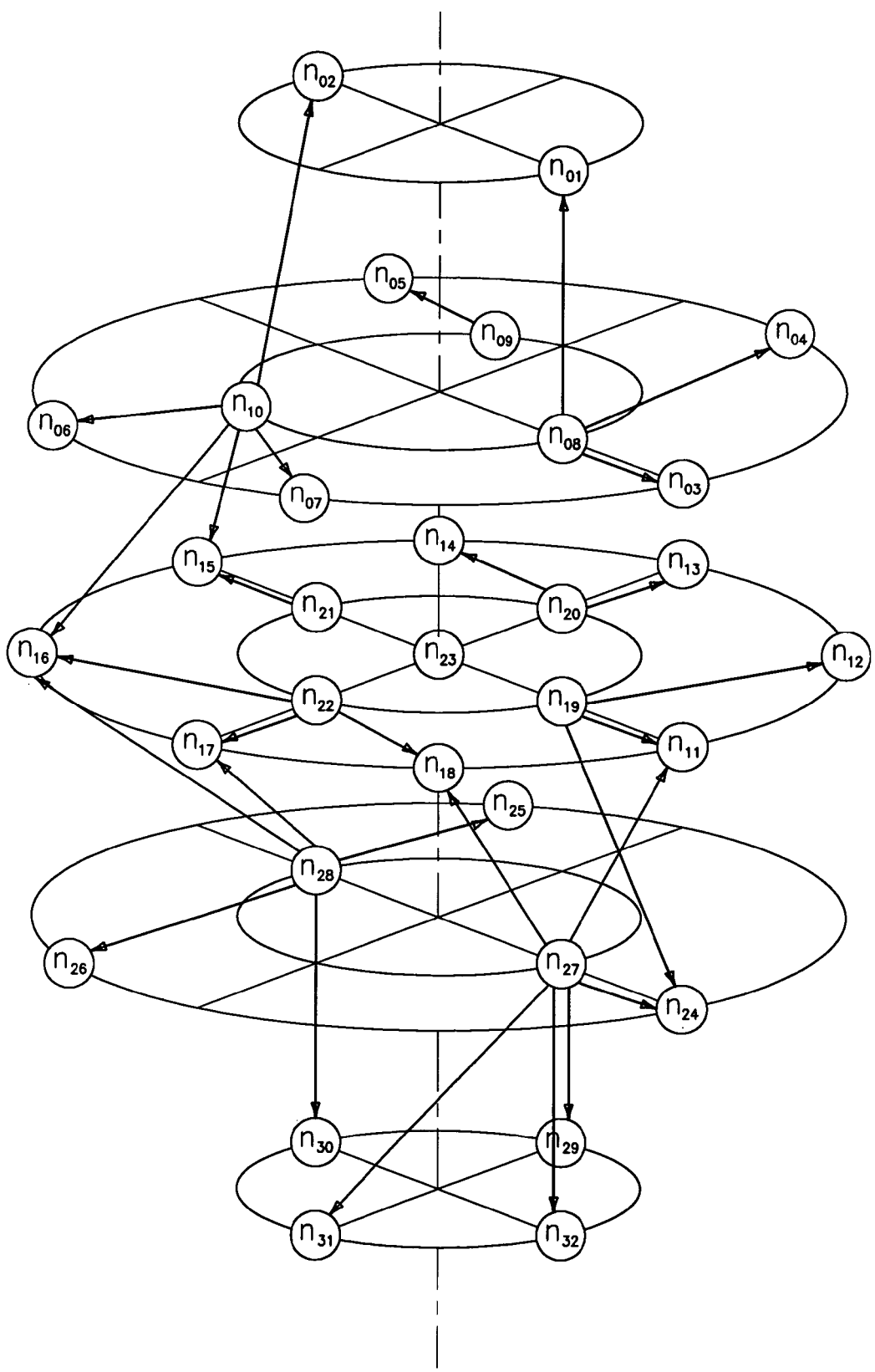
FIG. 5 is a schematic visualization of an optimized arrangement of the network of FIG. 4, according to an embodiment of the present invention.

FIG. 5 shows a visualization of the same network, after having been processed and a data structure generated in accordance with the present invention. Again, each element has been placed on the circle it belongs to, but now in addition it has ended up being carefully positioned on a grid position within the circle such that the resulting visualization exhibits a near minimal entanglement of links (again, only the 1-2 links are shown). These placement decisions are done by the gradient approach described below. The assignment of the unique identifiers $n_{xy}$ has not changed.

5. Gradient Method: Exemplary Minimizing Algorithm

In the following, an algorithmic description of a minimizing algorithm in accordance with the present invention is given. The algorithm below might for example be used to generate the data structure visualized in FIG. 5 from the network data visualized in FIG. 4. The following algorithm is one possible example to find a network visualization which exhibits a near minimal entanglement of the links.

| | Minimizing Algorithm |
|---|---|
| 1. | Place the user-selected central element c on the central location |
| 2. | Find all first neighbors to the central element in the network, i.e. all elements which are directly connected to the central element:<br>$H = \{h_1, h_2, \ldots\}$ the set of all horizontal first neighbors<br>$U = \{u_1, u_2, \ldots\}$ the set of all upward first neighbors<br>$D = \{d_1, d_2, \ldots\}$ the set of all downward first neighbors |
| 3. | Find all second neighbors to the central element in the network, i.e. all elements which are directly connected to a first neighbor and are not first neighbors themselves:<br>$HH = \{hh_1, hh_2, \ldots\}$ the set of all horizontal-horizontal second neighbors<br>$UH = \{uh_1, uh_2, \ldots\}$ the set of all upward-horizontal second neighbors<br>$DH = \{dh_1, dh_2, \ldots\}$ the set of all downward-horizontal second neighbors<br>$UU = \{uu_1, uu_2, \ldots\}$ the set of all upward-upward second neighbors<br>$DD = \{dd_1, dd_2, \ldots\}$ the set of all downward-downward second neighbors |
| 4. | Determine the number n of elements in the largest set of the collection H, U, D, HH, UH, DH, UU, DD. Fill all sets to a total of n elements with dummy elements (they will not appear in the visualization) |
| 5. | Assign to each element in the sets H, U, D, HH, UH, DH, UU, and DD a random position p ($0 <= p < n$) on its circle (note that this can also be done with a placing algorithm) |
| 6. | Set the iteration counter m = 1 |
| 7. | Compute for each element its local energy:<br>$$e_i = \begin{cases} \dfrac{a_1 l_i + a_2 m_i + a_3 c_i}{n_i}, & i \text{ is regular node} \\ 0, & i \text{ is dummy node} \end{cases}$$<br>where<br>$a_1, a_2$, and $a_3$ are weights (real numbers),<br>$l_i = S_{j \in I} \text{ length}(x_{ij})$<br>$m_i = S_{j \in I'} \text{ length}(x_{ij})$<br>$c_i = \frac{1}{2} S_{j \in I} \text{ cross}(x_{ij})$<br>$n_i$ = the number of links connected with element i<br>I = the set to which element i belongs<br>(I = H, U, D, HH, UH, DH, UU, or DD)<br>I' = the union of all sets of all elements to which element i does not belong<br>$\text{length}(x_{ij})$ = length of link from element i to element j<br><br>$\text{cross}(x_{ij}) = $<br>$\begin{cases} \text{number of crossings of the link from element} \\ \text{i to element j with all other links between} \\ \text{elements of the set I, if the link from element} \\ \text{i to element j exists 0, otherwise} \end{cases}$ |
| 8. | Compute the total energy of the visualization: $E = S_i n_i e_i$, where the sum ranges over all elements in the sets H, U, D, HH, UH, DH, UU, and DD |
| 9. | Find the element $i_m$ with the m-th highest local energy (e.g. for m = 1 the highest local energy) |

-continued

Minimizing Algorithm

10. Swap the positions of element $i_m$ with all elements $j$ Î $I_m$ and compute the total energy of each visualization. Determine the swapping with the least total energy $E_{min}$
11. If $E_{min} < E$ perform this swapping and go back to step 7
12. Increment m by 1
13. If m < M = total number of first and second neighbors go back to step 7

This algorithm terminates in polynomial time with a near optimal arrangement of the elements on the grid positions so that the resulting visualization exhibits near minimal entanglement of the links.

Note again that this algorithmic description is for illustrational purposes only. It can be modified in many places and still accomplish the same result. For instance, one modification is to compute in step 7 the local energy by dividing by the square root of $n_i$ (instead of $n_i$), and in turn in step 8 the total energy by multiplying by the square root of $n_i$ (instead of $n_i$).

The principles of the present algorithms may be applied in a wide range of systems. An algorithm in accordance with the present invention may be used singly or in combination with other algorithms.

6. Exemplary Uses of the Visualization Tool

A visualization tool that is based on the inventive scheme can be used to generate a data structure for displaying the respective network—or a portion thereof—on a display. Additional tools or routines can be employed to allow viewing of the network from different angles and view points. A user may also navigate through the network to get a better understanding of certain elements, links, and their association or relationship. This can be considered the first exemplary use of the visualization tool.

Furthermore, the inventive scheme can also be used for:
a) creating a network and corresponding data structure from scratch;
b) updating a network and the corresponding data structure (e.g. by adding an element or link);
c) acting upon an element or link kept in a network and the corresponding data structure.

These three processes are examples that indicate how flexible, powerful, and effective the present scheme is. The processes will now be outlined in connection with a database (network) that has a fractal hierarchical structure.

a) Creating a Network and Corresponding Data Structure from Scratch

There are many ways to create a network. In the following, an approach where network data representing a network is generated manually will be concentrated on. Using an appropriate editor or graphical user interface, a user may generate the network data by first defining some initial parameters of the network. This step is optional. Then, element after element is added and its relationships (links) are defined. General purpose tools or special tools can be used to do this.

As mentioned above, there are other ways to generate network data. One may for example use a system that extracts the elements and links from an input string in order to build network data.

Then, an algorithm in accordance with the present invention (for example, the minimizing algorithm described above) is employed to convert the network data into a data structure for display on a graphics display. The network data are converted into some arrangement of elements which is defined to be the current arrangement with a corresponding current global value. A gradient method is then employed to transform the current arrangement to an optimal arrangement with a minimal or maximal, or near-minimal or near-maximal, global value.

Instead of using general purpose tools to add elements and links, the user may place new elements somewhere on the screen, preferably on an initially blank grid. In a next step, the user then may establish links between the elements to account for the new elements' relationships among themselves. A graphical user interface, e.g. a drag and drop technique and a snap to grid feature, may be used to do all this.

b) Updating a Network and the Corresponding Data Structure

In the following, a situation where an element is added to a database is concentrated on. There are many other situations where the network and the corresponding data structure undergoes an update, e.g., if an element is removed, if a link is changed, if a relationship between elements is changed, and so forth. In all cases where the network data are updated the corresponding data structure may be re-calculated using an algorithm in accordance with the present invention (e.g., the minimizing algorithm described above).

If an element is to be added (for the sake of simplicity, herein referred to as "new element") to a database the following steps may be carried out.

An input network is generated from an input string which describes the new element. This input network is deemed to be related to the new element. It may comprise information concerning the new element's relations to existing elements in the database. The database may be consulted in obtaining the input network. The input string can be created by a user or an application, or it can be automatically generated from the new element. This can be done by a mechanism that crawls through the new element to extract information which characterizes it and/or its content. An automatic object recognition scheme might be used for that purpose.

Instead of generating the input network from an input string, the content of the new element can be automatically analyzed and the result can be used to generate the input network. In this case an input string is not necessarily needed.

It is also conceivable that a combination of the above methods is employed to generate the input network. In this case, both an input string and the contents of the new element would be taken into consideration when generating the input network.

In the next step, the database is updated with information describing or defining the new element. This can be done by associating the input network with the database, or by adding the new element or the input network to the database. If the database is of hierarchical nature and all elements are alike, then the input network which is to be added to the database preferably also has a fractal hierarchical structure.

Instead of generating and adding an input network, the user may manually add the new element directly to a network that is displayed on a screen. In order to do so, the user may place the new element somewhere on the screen, preferably adjacent to an element that the user deems to be related to the new element. In the next step, the user may establish links to other elements to account for the new element's relationships with these other elements. A graphical user interface (GUI), e.g. a drag and drop technique and a snap to grid feature, may be used to do all this.

In order to allow a system or user at a later point in time to act upon the new element, an access pointer may be needed. This access pointer provides a physical or logical link (e.g. a memory address) between the new element and some other instance or element. The access pointer can be used for accessing the new element in the database, or for retrieving the new element from the database, or for opening the new element using an appropriate application program (e.g., a text processor), or for displaying the new element, or for performing an operation on the access pointer as such. One might, for example, take the access pointer and send it to another user. The access pointer may describe the physical or logical location where said new element is stored in the database.

An algorithm in accordance with the present invention (e.g., the minimizing algorithm described above) is now employed to generate a data structure which represents the minimum or maximum of the global value. There are at least two different approaches (A) and (B) to do this. In any case, the new arrangement of elements, i.e. the arrangement of elements after the new element was added, is defined to be the current arrangement.

Approach (A): The algorithm in accordance with the present invention (e.g., the minimizing algorithm described above) is applied to all elements of the network to find a new optimal arrangement from the current arrangement. This may yield a completely different data structure and visualization thereof.

Approach (B): Instead of employing the algorithm to all elements of the network (approach A), one may simply take the newly added element and re-arrange it in the data structure until an arrangement with a global value is found that is lower or higher than the current global value. In most cases the approach (B) will lead to sub-optimal solutions. However, it is an advantage of this approach that it is faster and less time consuming than approach (A). It is a further advantage of approach (B) that the user can more easily understand what happened after the new element was added, because the new arrangement remained almost the same. Approach (A) may result in a completely different data structure and visualization thereof.

Note that there are two ways for adding an element to a database: either 1) it can be added physically to the database which means that the new element's content is moved into the database; or 2) it can be added logically. In this case the physical element remains outside the database, i.e., it is not moved into the database, but just a semantical unit or name representing this new element is added to the database.

c) Acting Upon an Element or Link Kept in a Network and the Corresponding Data Structure If an element in a database is to be acted upon, the following steps may be carried out. For sake of simplicity this element is herein referred to as target element.

Before a user or system can act upon the target element in the database, the respective element must be located. In order for the system to be able to locate the target element, an input string may be needed which contains information that helps to identify the element. This input string is received by the system. It may comprise keywords, or textual information. The keywords or textual information can either be human readable or machine readable. To improve the interaction between a user and the system, a speech recognition module can be employed such that the user can 'talk' to the system. The speech recognition module then transforms the speech into textual information which is then processed the same way as other input strings. Another way to improve the interaction between a user and the system is to install a camera that is used to record the user's behavior. An image recognition module then transforms the behavior into textual information which is then processed the same way as other input strings. In all cases the textual information may be evaluated by consulting the database.

Then, the input string is evaluated. This is done in order to obtain an input network which in turn defines a local network within the database. The local network is defined to be a portion, or segment, or set of segments of the database to which the input string is deemed to be related. The local network is defined such that it comprises at least one representation (e.g., a semantical unit or name) of the target element to which the input string seems to be related or associated. If no representation is found, the process is stopped, or the user or system might be prompted for additional information which helps to clarify the information conveyed in the input string. The database may be consulted in obtaining the input network. The local network within the database can be defined such that it comprises representations of those elements which are in a (semantical) neighborhood (as computed from the distance function) to the element(s) of the input network. In other words, the local network within the database can be defined such that it comprises representations associated to the input string.

Assuming that at least one related or associated element was found, this element is displayed. The element can be displayed on a screen, for example, or it can be highlighted inside the network representing the database. The elements can be arranged or displayed to give the user clues about their contents. The system may create a human-understandable output, such as a map or other kind of visual or audible representation of the elements that the system deems are related to the target element the user is looking for. The present minimizing algorithm may be used to find the optimal arrangment of elements and links on a screen.

If there is just one element that is deemed to be related or associated to the input string, the user or the system can act upon the corresponding database element (target element) by using the access pointer that is associated with this particular element. The access pointer can be used for accessing the target element in the database, or for retrieving it from the database, or for opening it using an appropriate application program (e.g., a text processor), or for displaying it, or for performing an operation on the access pointer as such. For example, one might take the access pointer and send it to another user. The access pointer may describe the physical or logical location where said target element is stored in the database.

If there is more than one element that is deemed to be related or associated to the input string, the user or system can act upon one or more of the respective database elements by using the access pointers that are associated with these elements. Alternatively, the user may be prompted for additional information to clarify the input string and reduce the number of elements that are deemed to be related or associated to the input string.

Instead of using the above approaches, the user herself may try to locate the target element on the display screen. This can be done by navigating through the displayed network and by looking for elements that the user considers to be related to the target element. After she is able to locate the respective element inside the network, the user can act upon it directly.

An element can be acted upon using a computer mouse, a key on a computer keyboard, or a combination of keys on a computer keyboard, for example.

An algorithm in accordance with the present invention (e.g., the minimizing algorithm described above) can be employed to find an optimal arrangement after the user acted upon one or more elements. This is only necessary, if the user has changed aspects of the database (network), e.g. after having changed or modified an element's relationship (links) with other elements, a re-calculation of the data structure may be desirable. For this purpose an algorithm in accordance with the present invention may be employed.

7. First Embodiment in Hardware

Figure 6A:
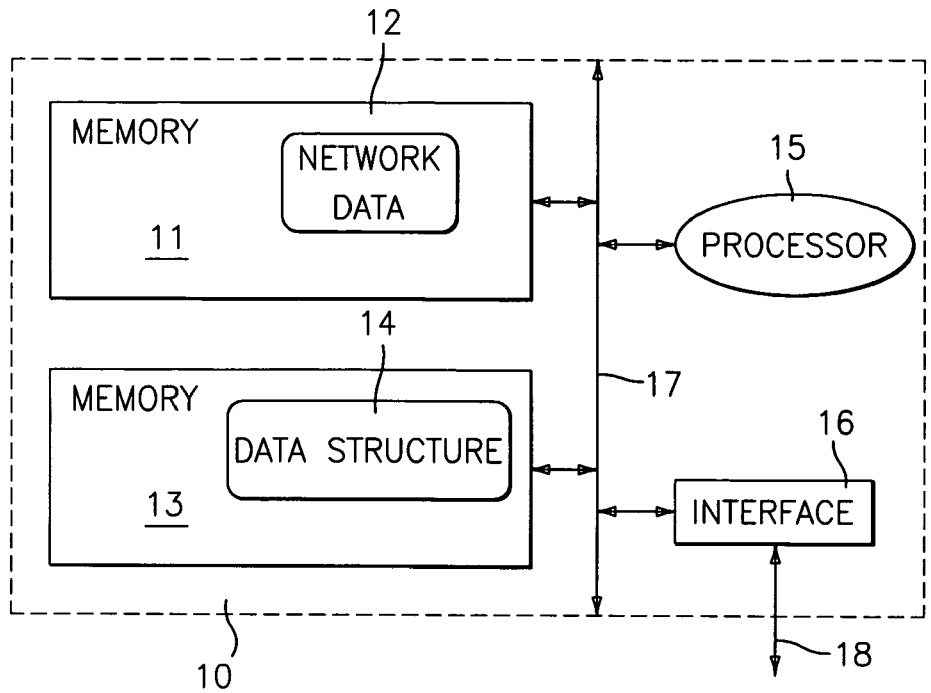
FIG. 6A is a schematic hardware structure of a visualization system, according to a first embodiment of the present invention.

The schematic hardware structure of a visualization system 10, according to a first embodiment of the present invention, is shown in FIG. 6A. The system 10 comprises a memory 11 for storing network data 12, a memory 13 for storing the corresponding data structure 14, a processor 15 (CPU), an interface 16, a bus structure 17, and input/output means 18. The interface 16 and input/output means 18 allow the visualization system 10 to be connected to a display screen, network, or the like. Furthermore, the system 10 is capable of receiving input through the input/output means 18 and interface 16. Note that in the present embodiment there is one memory 11 for storing the network data 12 and one memory 13 for storing the data structure 14. The network data 12 and the data structure 14 can likewise be stored in one and the same memory. A tape drive, a hard disk drive, a semiconductor memory, or any other storage system may serve as memory.

In the first embodiment of the present invention, the network data 12 and the data structure 14 coexist. It is also conceivable that the network data 12 is step-by-step transformed into the corresponding data structure 14 such that at the end of this process there is just the data structure 14 but no network data anymore.

Figure 6B:
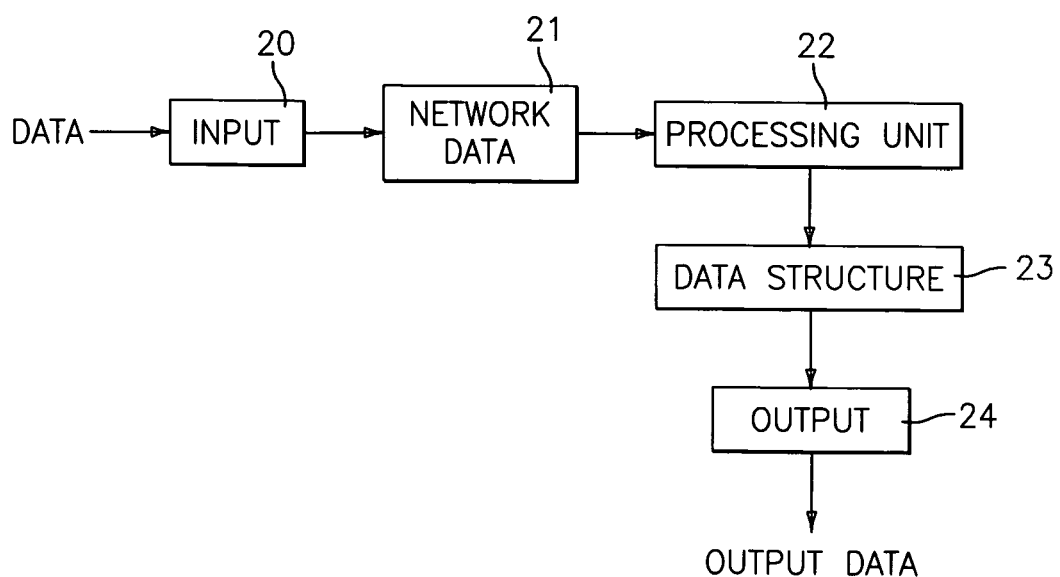
FIG. 6B is a schematic logical block diagram of the visualization system of FIG. 6A.

The corresponding logical block diagram is given in FIG. 6B. According to the first embodiment of the present invention, data is received via an input 20. This data is either network data, i.e., data which represent the elements and the relationships (links) between elements, or raw data which can be used to derive network data. In FIG. 6B, it is assumed that the received data is network data 21. If the received data is raw data, then an additional logical unit (e.g. a semantic processor or meaning extractor) is required that transforms raw data into network data 21. The logical block diagram of the first embodiment comprises a processing unit 22 that embodies the present minimizing algorithm. The processing unit 22 may be realized in hardware and/or software. The unit 22 receives the network data 21 and applies an algorithm in accordance with the present invention in order to generate the data structure 23. This data structure 23 has a plurality of elements and links between elements. In a first step, network data 21 is converted into some initial data structure representing an initial grid arrangement of the plurality of elements such that each element of the plurality of elements is placed on an individual grid position of a lattice. Then, a global value (global energy) is assigned to this initial grid arrangement of the plurality of elements whereby the global value depends on the initial grid arrangement of an element with respect to the current grid positions of said element's neighbors. In a subsequent step, the initial grid arrangement is modified to generate another grid arrangement of the plurality of elements with a gradient method on the global value of the grid arrangement of the plurality of elements. At this point, the processing may be stopped and the current grid arrangement of the plurality of elements is considered to be the final one.

Likewise, the above steps may be repeated until the global value of the current grid arrangement of the plurality of elements reaches a minimum or a maximum, depending upon the implementation of the algorithm. When this minimum or maximum is reached or almost reached, the processing may finally be stopped and the current grid arrangement of the plurality of elements is considered to be the final one.

This final grid arrangement is represented by a corresponding final data structure 23 which can be fed via output 24 to some graphics display system, or via a network or communications link to another system. Note that the final data structure 23 may either have a format that can be displayed on a display without further mapping or transformation, or it may have a format that has to be mapped or transformed into image data. In the first embodiment of the present invention, the data structure is formatted such that it can be displayed on a display screen without further transformation.

8. Second Embodiment in Hardware

Figure 7A:
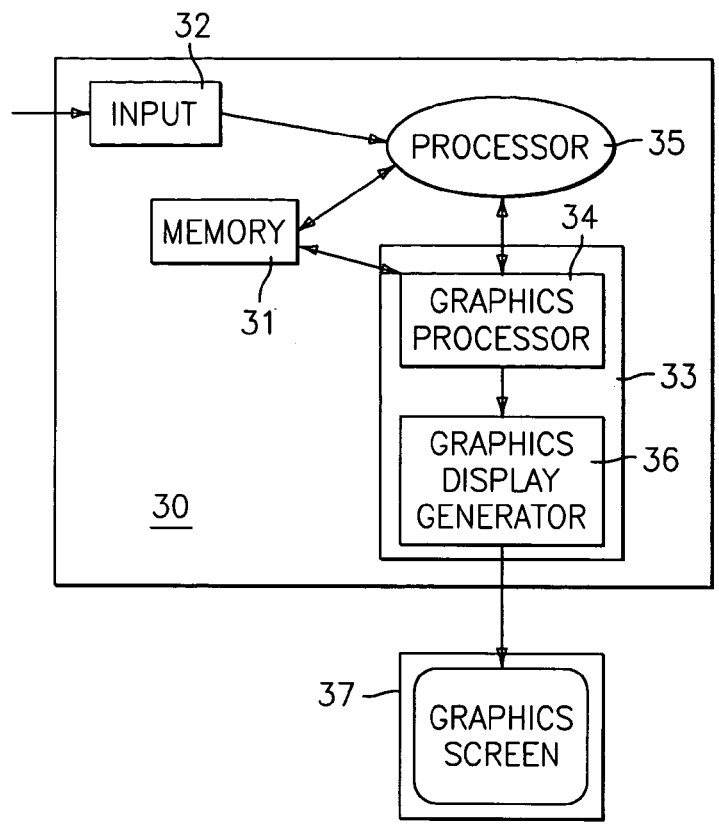
FIG. 7A is a schematic hardware structure of another visualization system, according to a second embodiment of the present invention.

The schematic hardware structure of a visualization system 30, according to a second embodiment of the present invention, is shown in FIG. 7A. This system 30 comprises an input 32. This input 32 may receive data from a keyboard, a mouse, or some other peripheral device, or from a communications link, for example. The system 30 furthermore comprises a memory 31 which stores the data, network data, and data structure. Memory 31 may be a random access memory (RAM) for example. There is also a processor 35 and an output interface 33 with a graphics processor 34 and a graphics display generator 36. The processor 35 accesses and/or fetches, as necessary, files (e.g. the network data and data structure) and programs (e.g. a program that embodies the present invention) from memory 31. The graphics processor 34 can be implemented as either a hardware circuit or as a software program recalled from memory 31 and executed by the processor 35. In operation, the graphics processor 34 produces image data (e.g., a pixel map) from the data structure. This image data is used by the graphics display generator 36 to produce, on graphics display 37, a graphical representation of the network data, as generated by the present minimizing algorithm. The image data may be stored in the memory 31, for example. There may also be a separate memory for storing the image data. The image data can also be stored on a storage medium (e.g. a diskette) such that they can be carried to another system. Image data can also be transmitted via a communications link, or network to another system.

The output interface 33 is connected to a graphics display 37. The system 30 comprises a computer program (not shown) that, when being executed by the processor 35, controls the system 30 such that it carries out the method which—according to the present invention—transforms the network data into a data structure that can then be processed by the interface 33 so that it can be displayed on the graphics display 37. This is very similar to what has been described in connection with the first embodiment. Accordingly, a detailed description of each of the steps is omitted for brevity.

Figure 7B:
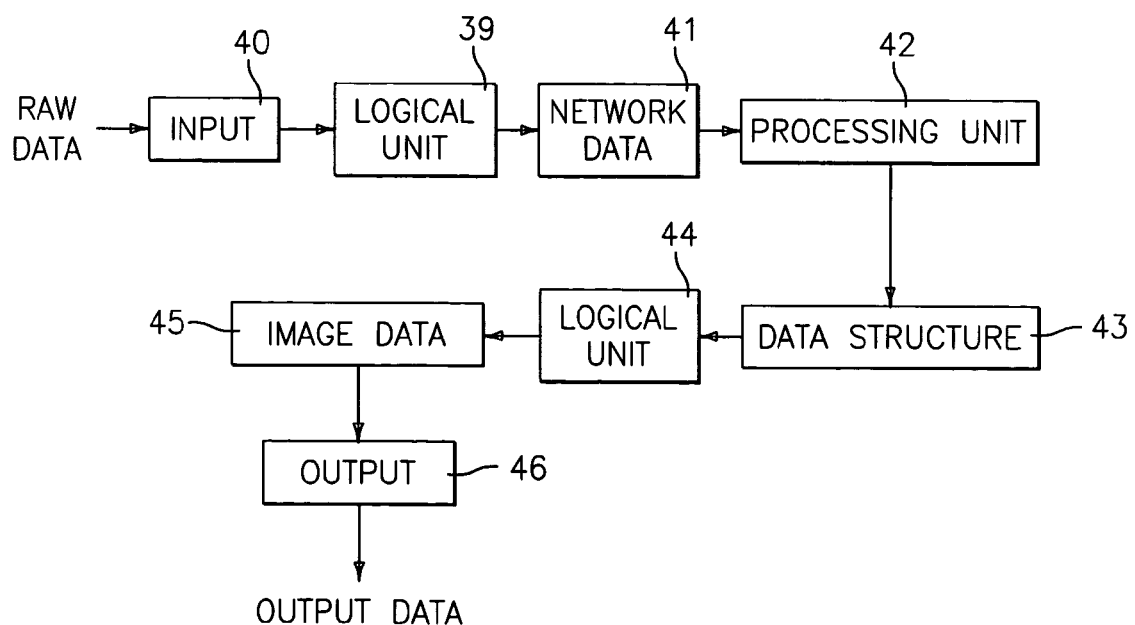
FIG. 7B is a schematic logical block diagram of the visualization system of FIG. 7A.

The corresponding logical block diagram is given in FIG. 7B. According to the second embodiment of the present invention, raw data is received by an input 40. This raw data can be used to derive network data. A logical unit 39 (e.g. a semantic processor or meaning extractor) is employed that transforms the raw data into network data 41. The second embodiment further comprises a processing unit 42 that embodies the present minimizing algorithm. The processing unit 42 may be realized in hardware and/or software. The unit 42 receives the network data 41 and applies the minimizing algorithm in order to generate the data structure 43. Details of this process are described above and are not repeated for sake of brevity.

In the present example, the data structure 43 has a format that cannot be used for generating an image on the graphics display 37. An additional logical unit 44 is employed that produces appropriate image data 45 from the data structure 43. This image data 45 can be sent via an output 46 to the graphics display 37, for example.

9. Conclusion: Various Uses of the Present Invention

The present invention can be used in different kinds of situations, environments, and systems. An algorithm in accordance with the present invention can also be employed to visualize details of a knowledge database, as described in the already mentioned PCT patent application with application number PCT/IB99/00231. This knowledge database is a fractal network that represents knowledge. It has a unique structure, as described in the co-pending PCT patent application. It is a kind of library describing the knowledge of the world, or a particular area of interest thereof, by using a well-defined structure that consists of components such as possible relevant types of semantical units (elements) and their possible mutual connections (links).

The structured representation of aspects of the world with the knowledge database is achieved by a multiscale approach. Self-similar representations are used on different scales to describe the behavior of the elements and links in a dynamical hierarchical fashion. Furthermore, self-similar algorithms are used when making use of the knowledge contained in this database (network). The knowledge database is a complex fractal hierarchical network of semantical units (elements).

Each connection object (link) may carry a fixed or variable weight (also called semantical distance), where a suitable function of the weight of a connection object (link) represents some kind of semantical distance between the two semantical units (elements) it connects, i.e., it represents the degree of (semantical) association between the two semantical units (elements) across this particular link. Weights may be used to compute the semantical distance of any two linked elements. Thus, this concept of semantical distance establishes a metric on the knowledge database. One can use these weights when visualizing a network, or a variable or fixed threshold below which connections are ignored when visualizing the network. So if two elements are connected through (for instance) three links (thus involving two more elements), and the product or other suitable combination of the three weights is below the threshold (or, equivalently, the sum or other suitable combination of the three distances is above a different threshold), then one can assume that there is no association between the two elements. This method allows to make the network local, i.e., each element has only a limited number of associations and the local network structure around each element is not too difficult. Instead of displaying the whole network with all its elements and links one may concentrate on the local network only.

Elements in the knowledge database may carry a "potential". If an element carries a potential, it corresponds to the element's importance in relation to some other element or its importance within the network or a subnet. The potential can also be used when computing a data structure for visualization.

Programs built using the present scheme will enable users to visualize and graphically edit networks.

Another possible application is a three-dimensional (3D) visualization of site maps on the World Wide Web (WWW). The present invention can be used in connection with printed circuit board design systems as well. There are many more possible applications as almost all intelligent systems rely heavily on networks and their visualization.

The present invention allows users to:
visualize network information in an easily comprehensible way;
format network information;
make changes to the elements (nodes, etc.) and/or links (connections);
make changes to the network's layout;
explore networks;
construct networks;
maintain networks;
show the topological structure of a network;
align elements (nodes, etc.) and/or links (connections);
visually inspect networks (graphs);
fold/unfold areas or sections of a network;
animate a network, the construction of a network, etc.;
provide alternative views for networks (graphs);
provide the optimal arrangement of elements of a network;
provide a drag and drop interface;
visualize dynamical hierarchical networks;
visualize complex fractal hierarchical networks, and so forth.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

In the drawings and specification there have been set forth several embodiments of the invention and, although specific terms are used, the description thus given uses terminology in a generic and descriptive sense only and not for purposes of limitation.

While the invention has been shown and described with reference to a certain preferred embodiments, it will be understood by those skilled in the art that various changes in form and details may be made therein without departing from the spirit and scope of the invention as defined by the appended claims.

What is claimed is:

1. A method for converting network data into a data structure for use by a graphics display system, comprising the steps of:
    receiving network data representing a network with a plurality of elements and links between elements; and converting the network data into a data structure representing a grid arrangement of the plurality of elements where each element of the plurality of elements is placed on an individual grid position of a lattice, by:
(a) assigning a global value to an initial grid arrangement of the plurality of elements which depends on the arrangement of one element of the plurality of elements with respect to the grid positions of said one element's neighbors; and
(b) modifying the initial grid arrangement to generate another grid arrangement of the plurality of elements using a gradient method based on the global value of the grid arrangement of the plurality of elements, the plurality of elements of the another grid arrangement each being placed on an individual position of the lattice,
wherein an initial element is selected from among the plurality of elements using the gradient method and a local energy of the initial element, the another grid arrangement is generated by transposing the initial element and another element, and the global value is determined based on a local energy of each of the plurality of elements.

2. The method of claim 1, further comprising the step of: repeating steps (a) and (b) until the global value of the grid arrangement of the plurality of elements equals a minimal or maximal global value of the network.

3. The method of claim 1, further comprising the step of: repeating steps (a) and (b) until a minimal entanglement of the links is obtained.

4. The method of claim 1, further comprising the step of: repeating steps (a) and (b) until a minimal length of the links is obtained.

5. The method of claim 1, wherein the gradient method is employed such that the modification of the initial grid arrangement maximizes a change in the global value for all nodes paired with the initially-selected element.

6. The method of claim 1, wherein the gradient method allows a shift in emphasis between minimizing the number of crossings of the links and minimizing the length of the links, such that any combination of the two are possible.

7. The method of claim 1, wherein each element has a local value, and the global value is the sum of all local values.

8. The method of claim 7, wherein the gradient method modifies the initial grid arrangement starting with an element with the highest local value for any possible arrangement of the elements on the grid.

9. The method of claim 1, wherein the gradient method embodies a minimizing algorithm or a maximizing algorithm.

10. The method of claim 1, wherein the gradient method is of polynomial complexity.

11. The method of claim 1, wherein the global value is related to the degree of comprehensibility of the visualization of the network.

12. The method of claim 1, wherein a simulated annealing method is employed that randomly shuffles the elements so as to jump out of local minima or maxima traps in order to obtain a true global value.

13. The method of claim 1, wherein the lattice has a finite number of grid positions.

14. The method of claim 1, wherein the elements are visualized as circles or spheres, and the links are visualized as lines or arrows.

15. The method of claim 1, wherein an element or a link can be selectively suppressed.

16. The method of claim 1, wherein the network is hierarchical or fractal hierarchical.

17. The method of claim 1, wherein the network has a hierarchical structure, and the hierarchical structure is visualized by arranging the elements in vertically stacked layers corresponding to the levels of hierarchy.

18. A visualization tool for converting network data, which represent a plurality of elements and links between elements, into a data structure, which represents a grid arrangement of the plurality of elements where each element of the plurality of elements is placed on an individual grid position of a lattice, such that the data structure is suited for use by a graphics display, comprising:
a storage device for storing the network data;
a storage device for storing the data structure; and
a processing unit for processing a gradient method;
wherein the processing unit generates an initial data structure, which represents an initial grid arrangement of the plurality of elements, assigns a global value to this initial grid arrangement, employs the gradient method for converting the initial grid arrangement into another grid arrangement which has a decreased or an increased global value, the plurality of elements of the another grid arrangement each being placed on an individual position of the lattice,
wherein an initial element is selected from among the plurality of elements using the gradient method and a local energy of the initial element, the another grid arrangement is generated by transposing the initial element and another element, and the global value is determined based on a local energy of each of the plurality of elements.

19. The visualization tool of claim 18, further comprising: a graphics display system.

20. The visualization tool of claim 19, wherein the graphics display system comprises a graphics processor and a graphics display.

21. The visualization tool of claim 19, wherein the graphics display system generates image data from the data structure.

22. The visualization tool of claim 18, wherein the processing unit modifies the initial grid arrangement of the plurality of elements to generate another grid arrangement of the plurality of elements with a gradient method on the global value of the grid arrangement of the plurality of elements.

23. The visualization tool of claim 18, wherein the emphasis can be shifted between minimizing the number of crossings of the links and minimizing the length of the links, such that any combination of minimizations may be achieved.

24. The visualization tool of claim 18, wherein the gradient method modifies the initial grid arrangement starting with an element with a highest local value for any possible arrangement of the elements on the grid.

25. The visualization tool of claim 18, wherein a simulated annealing method is processed by the processing unit, said simulated annealing method randomly shuffling the elements so as to jump out of local minima or maxima traps in order to obtain a true global value.

26. The visualization tool of claim 18, wherein the lattice has a finite number of grid positions.

27. The visualization tool of claim 18, wherein the elements are visualized as circles or spheres, and the links are visualized as lines or arrows.

28. The visualization tool of claim 18, wherein an element or a link can be selectively suppressed.

29. The visualization tool of claim 18, further comprising: means for receiving network data.

30. A visualization tool for converting network data, which represents a network with a plurality of elements and links between elements, into a data structure, which represents a grid arrangement of the plurality of elements, where each element of the plurality of elements is placed on an individual grid position of a lattice, such that the data structure is suitable for use by a graphics display, comprising:
a storage device for storing the network data;
a storage device for storing the data structure; and
a processing unit for processing a gradient method;
wherein the processing unit converts the network data into an initial data structure with an initial degree of entanglement of links, which in turn is transformed into another data structure by using the gradient method such that the degree of entanglement of the links is reduced using a series of element transpositions which transpose an initial element and another element from among the plurality of elements, the initial element being determined during each transposition using a global value and a local value of the initial element and the plurality of elements of the another grid arrangement each being placed on an individual position of the lattice.

31. The visualization tool of claim 30, further comprising: a graphics display system.

32. The visualization tool of claim 31, wherein the graphics display system comprises a graphics processor and a graphics display.

33. The visualization tool of claim 31, wherein the graphics display system generates image data from the data structure.

34. The visualization tool of claim 30, wherein the network is a computer program-produced network, a communications network, or a database.

35. The visualization tool of claim 30, wherein the emphasis can be shifted between minimizing the number of crossings of the links and minimizing the length of the links, such that any combination of minimizations may be achieved.

36. The visualization tool of claim 30, wherein the lattice has a finite number of grid positions.

37. The visualization tool of claim 30, wherein the elements are visualized as circles or spheres, and the links are visualized as lines or arrows.

38. The visualization tool of claim 30, wherein an element or a link can be selectively suppressed.

39. The visualization tool of claim 30, wherein the network is hierarchical or fractal hierarchical.

40. The visualization tool of claim 30, wherein the network has a hierarchical structure, and the hierarchical structure is visualized by arranging the elements in vertically stacked layers corresponding to levels of hierarchy.

41. The visualization tool of claim 30, further comprising: means for receiving network data.

42. A computer system for network visualization, said network visualization comprising:
at least one computer-readable memory including:
code for receiving network data representing a network with a plurality of elements and links between elements; and
code for converting the network data into a data structure representing a grid arrangement of the plurality of elements where each element of the plurality of elements is placed on an individual grid position of a lattice, by
assigning a global value to an initial grid arrangement of the plurality of elements which depends on the arrangement of one element of the plurality of elements with respect to the grid positions of said one element's neighbors, and
modifying the initial grid arrangement to generate another grid arrangement of the plurality of elements with a gradient method on the global value of the grid arrangement of the plurality of elements, the plurality of elements of the another grid arrangement each being placed on an individual position of the lattice,
wherein an initial element is selected from among the plurality of elements using the gradient method and a local energy of the initial element, the another grid arrangement is generated by transposing the initial element and another element, and the global value is determined based on a local energy of each of the plurality of elements.

43. The computer system of claim 42, wherein the code for converting network data into a data structure repeats the assigning and modifying steps until the global value of the grid arrangement of the plurality of elements equals a minimal or maximal global value of the network.

44. The computer system of claim 42, wherein the code for converting network data into a data structure repeats the assigning and modifying steps until a minimal entanglement of the links is obtained.

45. The computer system of claim 42, wherein the code for converting network data into a data structure repeats the assigning and modifying steps until a minimal length of the links is obtained.

46. The computer system of claim 42, wherein the gradient method is employed such that the modification of the initial grid arrangement maximizes a change in the global value for all nodes paired with the initially-selected element.

47. The computer system of claim 42, wherein the gradient method allows a shift in emphasis between minimizing the number of crossings of the links and minimizing the length of the links, such that any combination of minimizations may be achieved.

48. The computer system of claim 42, wherein the gradient method embodies a minimizing algorithm or a maximizing algorithm.

* * * * *